US012756546B2

(12) United States Patent
Toudeh-Fallah et al.

(10) Patent No.: US 12,756,546 B2
(45) Date of Patent: Oct. 6, 2026

(54) QUANTUM KEY DISTRIBUTION IN AN OPTICAL NETWORK AND QUANTUM-SECURED OPTICAL CHANNELS

(71) Applicant: Ciena Corporation, Hanover, MD (US)

(72) Inventors: Farzam Toudeh-Fallah, Galena, OH (US); Robert W. Keys, Stittsville (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 60 days.

(21) Appl. No.: 18/428,338

(22) Filed: Jan. 31, 2024

(65) Prior Publication Data

US 2025/0106012 A1 Mar. 27, 2025

Related U.S. Application Data

(60) Provisional application No. 63/585,545, filed on Sep. 26, 2023.

(51) Int. Cl.

| | |
|---|---|
| ***H04L 9/08*** | (2006.01) |
| ***H04B 10/11*** | (2013.01) |
| ***H04B 10/27*** | (2013.01) |

(52) U.S. Cl.

CPC ............ *H04L 9/0855* (2013.01); *H04B 10/11* (2013.01); *H04B 10/27* (2013.01); *H04L 9/0819* (2013.01)

(58) Field of Classification Search

CPC ... H04L 9/0852; H04L 9/0858; H04L 9/0855; H04L 63/061; H04L 9/083; H04L 9/0822;

(Continued)

(56) References Cited

U.S. PATENT DOCUMENTS

| | | | | |
|---|---|---|---|---|
| 3,192,766 A | | 7/1965 | Keys | |
| 5,764,765 A | * | 6/1998 | Phoenix | H04L 9/0858 380/256 |

(Continued)

FOREIGN PATENT DOCUMENTS

| | | |
|---|---|---|
| EP | 3 278 493 B1 | 11/2019 |

OTHER PUBLICATIONS

Marco Pistoia et al., "Paving the Way towards 800 Gbps Quantum-Secured Optical Channel Deployment in Mission-Critical Environments," Quantum Science and Technology, vol. 8, No. 3, May 15, 2023, 11 Pages.

(Continued)

*Primary Examiner* — Sharif E Ullah
(74) *Attorney, Agent, or Firm* — Baratta Law PLLC; Lawrence A. Baratta, Jr.

(57) ABSTRACT

Systems and methods for quantum key distribution in an optical network and quantum-secured optical channels. A node for operation in an optical network includes one or more degrees each connected to a corresponding optical span including one or more fibers; and one or more Quantum-Optical Service modules (QOSM) for each of the one or more degrees, each QOSM supporting Quantum Key Distribution (QKD) for establishing a quantum-secured channel and Optical Service Channel (OSC) functionality over the quantum-secured channel. A line amplifier system for operation in an optical network includes one or more optical amplifiers configured to amplify optical channels over an optical span in the optical network; and a trusted quantum repeater, connected to the optical span, and configured to support QKD for establishing a first quantum-secured channel and a second quantum-secured channel and OSC functionality over the first quantum-secured channel and the second quantum-secured channel.

20 Claims, 11 Drawing Sheets

(58) Field of Classification Search

CPC ....... H04L 9/3226; H04L 9/0891; H04L 9/14; H04L 9/0827; H04L 2209/24; H04L 9/08; H04L 9/0819; H04L 9/088; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC ........ 380/256, 255, 264, 276; 726/2, 21, 36; 713/150, 163, 181

See application file for complete search history.

(56) References Cited

U.S. PATENT DOCUMENTS 6,222,668 B1 4/2001 Dutrisac et al.
6,236,499 B1 5/2001 Berg et al.
6,275,331 B1 8/2001 Jones et al.
6,542,233 B1 4/2003 Bray et al.
6,618,193 B1 9/2003 Boertjes
6,748,083 B2 * 6/2004 Hughes ................ H04L 9/0858 380/278
6,751,414 B1 6/2004 Davies et al.
7,272,308 B1 9/2007 Boertjes et al.
7,420,919 B1 9/2008 Toudeh-Fallah et al.
7,437,081 B2 * 10/2008 Mitchell ................ H04B 10/70 398/154
8,090,259 B2 1/2012 Leclair et al.
8,364,036 B2 1/2013 Boertjes et al.
8,483,394 B2 * 7/2013 Nordholt ............... H04L 63/062 380/278
8,509,618 B2 8/2013 Boertjes et al.
8,509,621 B2 8/2013 Boertjes et al.
8,542,992 B2 9/2013 Jones et al.
8,554,074 B2 10/2013 Boertjes et al.
8,670,664 B2 3/2014 Leclair et al.
8,683,192 B2 * 3/2014 Ayling ................... H04B 10/70 713/153
8,750,706 B2 6/2014 Boertjes et al.
8,811,822 B2 8/2014 Leclair et al.
8,855,316 B2 * 10/2014 Wiseman .............. H04L 9/0855 380/278
8,958,696 B2 2/2015 Boertjes et al.
8,971,706 B2 3/2015 Gerstel et al.
9,077,474 B2 7/2015 Boertjes et al.
9,258,190 B2 2/2016 Swinkels et al.
9,344,193 B2 5/2016 Boertjes et al.
9,419,708 B2 8/2016 Rad et al.
9,455,788 B2 9/2016 Boertjes et al.
9,577,763 B2 2/2017 Al Sayeed et al.
9,634,791 B2 4/2017 Boertjes et al.
9,831,947 B2 11/2017 Boertjes et al.
9,831,977 B2 11/2017 Boertjes et al.
9,948,387 B2 4/2018 Frankel et al.
9,960,465 B2 * 5/2018 Dudley ............... H01M 50/204
9,973,295 B2 5/2018 Al Sayeed et al.
10,050,737 B1 8/2018 Al Sayeed et al.
10,057,058 B2 * 8/2018 Murakami ............ H04L 9/0858
10,069,706 B1 9/2018 Toudeh-Fallah et al.
10,368,149 B2 7/2019 Jones et al.
10,680,739 B2 6/2020 Swinkels et al.
10,715,888 B2 7/2020 Swinkels et al.
10,746,602 B2 8/2020 Pei et al.
10,784,980 B2 9/2020 Roberts et al.
10,868,614 B2 12/2020 Al Sayeed et al.
11,139,633 B2 10/2021 Pei et al.
11,196,504 B1 12/2021 Frankel et al.
11,228,383 B2 1/2022 Shiner et al.
11,272,269 B1 3/2022 Chedore et al.
11,394,537 B2 7/2022 Toudeh-Fallah et al.
11,411,365 B2 8/2022 Boertjes et al.
11,424,848 B2 8/2022 Boertjes et al.
11,463,189 B2 10/2022 Boertjes et al.
11,496,817 B2 11/2022 MacKay et al.
11,531,165 B2 12/2022 Jones et al.
11,632,171 B2 4/2023 Al Sayeed et al.
11,799,546 B2 10/2023 Pei et al.
11,811,459 B1 11/2023 Pei et al.
2003/0042402 A1 3/2003 Boertjes et al.
2003/0123880 A1 7/2003 Boertjes et al.
2003/0151802 A1 8/2003 Berg et al.
2005/0138352 A1 * 6/2005 Gauvreau ............ H04L 9/3247 713/153
2005/0221759 A1 * 10/2005 Spadafora ............. G08G 1/093 455/39
2007/0065154 A1 * 3/2007 Luo ...................... H04L 9/0852 398/141
2007/0076884 A1 * 4/2007 Wellbrock ............ H04L 9/0855 380/263
2007/0195774 A1 * 8/2007 Sherman ................ H04L 69/16 370/392
2007/0222994 A1 9/2007 Scobey et al.
2010/0027998 A1 2/2010 Farley et al.
2011/0206204 A1 * 8/2011 Sychev .................. H04J 14/06 380/256
2011/0213979 A1 * 9/2011 Wiseman ............. H04L 9/0844 713/171
2011/0243331 A1 * 10/2011 Yasuda ................ H04L 9/0836 380/46
2012/0045208 A1 * 2/2012 Yasuda ................. H04B 10/60 398/65
2012/0082464 A1 * 4/2012 Yasuda ............. H04B 10/6166 398/152
2012/0177201 A1 * 7/2012 Ayling ................. H04L 9/0858 380/278
2012/0237202 A1 * 9/2012 Abe .................. H04B 10/6164 398/16
2013/0051790 A1 * 2/2013 Yasuda ............. H04B 10/6151 398/16
2013/0101121 A1 * 4/2013 Nordholt .............. H04L 9/0852 380/279
2013/0266308 A1 * 10/2013 Fukuchi .............. H04B 10/616 398/16
2014/0010234 A1 * 1/2014 Patel ...................... H04L 45/74 370/392
2014/0068765 A1 * 3/2014 Choi .................. H04L 63/1416 726/23
2014/0133652 A1 * 5/2014 Oshida ................. H04L 9/0897 380/255
2014/0286638 A1 * 9/2014 Yasuda .................. H04J 14/06 398/65
2015/0120927 A1 4/2015 Hurley et al.
2015/0372765 A1 * 12/2015 Yasuda ............... H04B 10/613 398/29
2016/0036554 A1 * 2/2016 Yasuda .................. H04J 14/06 398/65
2016/0050025 A1 * 2/2016 Yasuda ............. H04B 10/6165 398/65
2016/0155327 A1 * 6/2016 Schlienz ............... A61H 3/061 340/907
2016/0241396 A1 * 8/2016 Fu ........................ H04L 9/0836
2016/0359626 A1 * 12/2016 Fu ........................ H04L 9/0858
2016/0366094 A1 * 12/2016 Mason ............... H04L 61/5038
2017/0214525 A1 * 7/2017 Zhao ................ H04W 12/0431
2017/0230173 A1 * 8/2017 Choi ..................... H04L 9/0861
2017/0338895 A1 * 11/2017 Yasuda ............. H04B 10/6971
2017/0338952 A1 * 11/2017 Hong ...................... H04L 9/083
2018/0076884 A1 3/2018 Archambault et al.
2018/0176091 A1 * 6/2018 Yoon .................. H04L 43/0888
2018/0248582 A1 * 8/2018 Yasuda ................... H04J 11/00
2018/0343059 A1 11/2018 Harley et al.
2019/0036821 A1 * 1/2019 Levy .................. G06F 12/0868
2019/0115983 A1 * 4/2019 Yasuda ............... H04B 10/612
2019/0173602 A1 6/2019 Al Sayeed et al.
2019/0174211 A1 6/2019 Swinkels et al.
2019/0260581 A1 * 8/2019 Su ............................ H04L 9/08
2019/0349392 A1 * 11/2019 Wetterwald ......... H04L 43/0852
2020/0084222 A1 * 3/2020 William ................. H04L 63/12
2021/0351841 A1 11/2021 Shiner et al.
2021/0351847 A1 11/2021 Frozenfar
2022/0132228 A1 4/2022 Frankel et al.

(56) References Cited

U.S. PATENT DOCUMENTS

| | | | | |
|---|---|---|---|---|
| 2022/0294529 | A1 | 9/2022 | Janulewicz et al. | |
| 2022/0329033 | A1 | 10/2022 | Demars et al. | |
| 2022/0360434 | A1* | 11/2022 | Choi | H04L 41/40 |
| 2023/0044243 | A1 | 2/2023 | MacKay et al. | |
| 2023/0125468 | A1 | 4/2023 | Campbell et al. | |
| 2023/0254041 | A1 | 8/2023 | Pei et al. | |
| 2023/0318729 | A1 | 10/2023 | Luk et al. | |
| 2024/0056294 | A1* | 2/2024 | Pruneri | H04B 10/70 |
| 2024/0283638 | A1* | 8/2024 | Yasuda | H04L 9/085 |
| 2025/0141671 | A1* | 5/2025 | Kawakami | H04L 9/0819 |
| 2025/0184124 | A1* | 6/2025 | Kim | H04L 9/0819 |

OTHER PUBLICATIONS

Robert Bedington, "Proposed updates to Draft D2.5 on clauses 7.1.2 and 7.2; QIT4N-I-200," Oct. 19, 2020, 18 Pages.

Jasminder S. Sidhu et al., "Advances in space quantum communications," IET Quantum Communication, vol. 2, No. 4, Jul. 19, 2021, pp. 182-217.

Oct. 2, 2025, International Search Report and Written Opinion for International Patent Application No. PCT/US2024/047956.

Clavis XG QKD System, "Quantum Key Distribution for production environments requiring high key transmission rate or extended range interconnection," Sep. 2023, 4 pages.

* cited by examiner

QUANTUM KEY DISTRIBUTION IN AN OPTICAL NETWORK AND QUANTUM-SECURED OPTICAL CHANNELS

CROSS-REFERENCE TO RELATED APPLICATIONS

The present disclosure claims priority to U.S. Provisional Patent Application Ser. No. 63/585,545, entitled "Quantum key distribution in an optical network and protection thereof," and filed Sep. 26, 2023, the contents of which are incorporated by reference in their entirety.

FIELD OF THE DISCLOSURE

The present disclosure relates generally to networking and computing. More particularly, the present disclosure relates to systems and methods for quantum key distribution in an optical network and quantum-secured optical channels.

BACKGROUND OF THE DISCLOSURE

Quantum computing poses future threats to current encryption techniques, such as Public Key Infrastructure (PKI), which relies on the computational difficulty of certain mathematical functions. Quantum Cryptography (QC) and Quantum Key Distribution (QKD) offer a different approach for encryption where the key distribution process is not based on mathematical functions, which may be broken by quantum computers, but which utilizes the properties of quantum mechanical systems to generate and distribute cryptographic keys. That is, quantum keys rely on the foundations of quantum mechanics, in contrast to traditional public key cryptography in PKI. Specifically, quantum keys can be generated based on properties of a communications link, e.g., a point-to-point fiber optic link, a satellite link, etc. Additionally, this approach is tamper-resistant based on an ability to detect eavesdroppers, i.e., if an attacker disturbs or looks at a quantum system, the quantum system will change in such a way that the intended parties involved will detect the presence of an eavesdropper. QKD, QC, etc. are classes of quantum-resistant methodologies, meaning their keys used in cryptographic protocols assure the confidentiality, integrity, and authentication of data, even against future quantum computers. With the future prospect of quantum computing and the threats to conventional public key cryptography, quantum-resistant methodologies are expected to proliferate.

There are challenges with quantum-resistant methodologies namely related to physical QKD, including a requirement to use special purpose hardware for QKD, increased cost and insider threats, securing and validating QKD, and the like. Solutions to these challenges are proposed herein.

BRIEF SUMMARY OF THE DISCLOSURE

The present disclosure relates to systems and methods for Quantum Key Distribution in an optical network and quantum-secured optical channels. Variously, the present disclosure includes approaches to integrate Quantum Key Distribution with existing optical networks, including more than a single point-to-point span. Further, the present disclosure contemplates uses of quantum cryptography to secure individual optical channels. This includes QKD distribution using existing physical optical networks that include terminal (e.g., Reconfigurable Optical Add/Drop Multiplexer (ROADM), fixed OADM, etc.) sites and optical amplifier sites, secured hardware included with existing optical networking hardware, and quantum-resistant encryption transmission technology. Within the existing structure of optical networks, the present disclosure includes a quantum-optical trusted repeater system for transporting quantum-secured optical channels including quantum-optical user nodes, multi-degree quantum-optical trusted repeater systems, quantum-secured coherent hyper service channels, and key management modules, all of which work in tandem to provide a versatile highly secure system. In an embodiment, the hyper service channel is used as the Optical Service Channel (OSC) used in existing optical networks. Of note, the present disclosure refers to this channel as a hyper service channel and those skilled in the art will appreciate other terminology is contemplated. Also, the present disclosure utilizes various terms for elements in the quantum-secured optical network and those skilled in the art will recognize different names with the same functions are possible.

Advantageously, the present disclosure provides an approach to integrate QKD into optical networks, thereby allowing key distribution as a service thereby removing the need for end users to separately deploy and manage the infrastructure of special purpose hardware. For example, encryption keys based on mathematical complexity can also be distributed on a quantum-secure optical channel as there is no public portion of the key.

In an embodiment, a node for operation in an optical network includes one or more degrees each connected to a corresponding optical span including one or more fibers; and one or more Quantum-Optical Service Modules (QOSM) for each of the one or more degrees, each QOSM supporting Quantum Key Distribution (QKD) for establishing a quantum-secured channel and Optical Service Channel (OSC) functionality over the quantum-secured channel. Each quantum-secured channel can be formed with an adjacent node which is one of another node or a line amplifier, and wherein the one or more QOSMs include circuitry configured to exchange keys over the quantum-secured channel. The node can further include one or more optical modems configured to support traffic channels over an optical span, wherein data transmitted via the one or more modems is encrypted based on one of the keys. A QOSM of the one or more QOSMs can include a transmitter and receiver, each supporting coherent modulation. The one or more QOSMs include a plurality of QOSMs, and the node further includes a session key transfer switch configured to switch keys from a first QOSM to a second QOSM, of the plurality of QOSMs.

A QOSM of the one or more QOSMs can include circuitry configured to implement a QKD service channel, a session key transfer service channel, the OSC functionality, and a key management service channel. A QOSM of the one or more QOSMs can include circuitry configured to implement a QKD service channel, wherein the circuitry is further configured to detect an intrusion on the QKD service channel and to one or more of provide an alarm and nullify any keys based thereon. The node can further include circuitry configured to implement an Application Programming Interface (API) between the one or more QOSMs and any data interfaces connected to associated degrees. A QOSM of the one or more QOSMs can include a hardened enclosure configured to detect physical intrusions and to adjust any keys based on detection of the physical intrusions. The node can further include a plurality optical modems configured to support traffic channels over the one or more degrees, wherein data transmitted via the plurality optical modems is encrypted based on a key from a corresponding QOSM, and at least two of the plurality optical modems utilize different keys.

In another embodiment, an intermediate node for operation in an optical network include one or more optical amplifiers configured to amplify optical channels over an optical span in the optical network; and a trusted quantum repeater, connected to the optical span, and configured to support Quantum Key Distribution (QKD) for establishing a first quantum-secured channel and a second quantum-secured channel and Optical Service Channel (OSC) functionality over the first quantum-secured channel and the second quantum-secured channel. The optical channels through the one or more optical amplifiers can be encrypted based on a key exchanged between nodes through the first quantum-secured channel and the second quantum-secured channel. The trusted quantum repeater can include a first transceiver connected to the first quantum-secured channel and a second transceiver connected to the second quantum-secured channel, wherein each of the first transceiver and the second transceiver utilize encryption based on the QKD. Each of the first transceiver and the second transceiver can support coherent modulation.

The trusted quantum repeater can include circuitry configured to securely transfer keys between the first quantum-secured channel and the second quantum-secured channel. The trusted quantum repeater can include circuitry configured to implement a QKD service channel, a session key transfer service channel, the OSC functionality, and a key management service channel. The trusted quantum repeater can include circuitry configured to implement a QKD quantum channel, wherein the circuitry is further configured to detect an intrusion on the QKD quantum channel and to one or more of provide an alarm and nullify any keys based thereon. The trusted quantum repeater can include a hardened enclosure configured to detect physical intrusions and to adjust any keys based on detection of the physical intrusions. The intermediate node can further include a hardened enclosure including the one or more optical amplifiers and the trusted quantum repeater, and circuitry configured to detect physical intrusions and to adjust any keys based on detection of the physical intrusions. The optical channels can include a plurality of optical channels, at least two of which utilize different keys for encryption thereof.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a network diagram of a point-to-point link with DWDM channels with one or more additional spans interconnecting enterprises or the like.

FIG. 7 is a network diagram of a mesh or ring interconnect with DWDM channels along with one or more additional spans interconnecting enterprises or the like.

FIG. 8 is a network diagram of a long-haul link between two sites (data centers) along with one or more additional spans interconnecting enterprises or the like.

DETAILED DESCRIPTION OF THE DISCLOSURE

Again, the present disclosure relates to systems and methods for quantum key distribution in an optical network and quantum-secured optical channels. In particular, the present disclosure includes techniques for securely delivering keys over a quantum-secured optical network. These techniques leverage the existing infrastructure of optical networks.

Thread Posed by Quantum Computers

Figure 1:
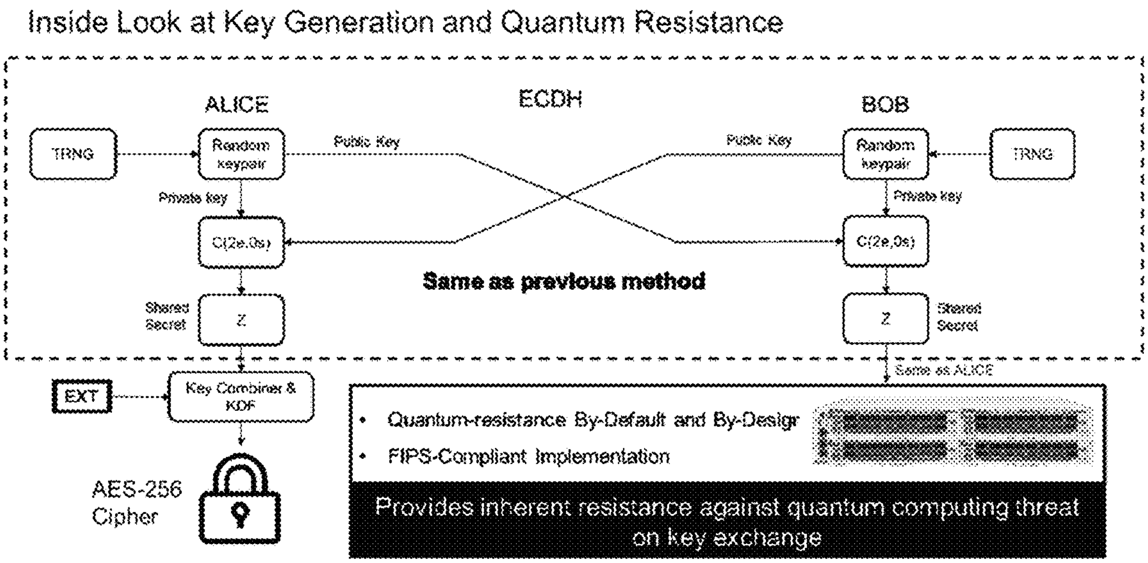
FIG. 1 is a diagram of two nodes (endpoints) configured for key generation and quantum resistance.

Future quantum computers pose a threat for today's key exchange encryption technology such as through a concept called "harvest now, decrypt later" . . . when quantum computers are powerful enough, especially with PKI. One way to provide quantum resistance is to have an eternal key provided to the encryption endpoints that is not transmitted between them. FIG. 1 is a diagram of two nodes (endpoints, labeled Alice and Bob) utilizing today's algorithmic based key exchange mechanism. Each node includes a True Random Number Generator (TRNG) used to generate a key pair (public and private keys) and the public keys are shared via Elliptic-curve Diffie-Hellman (ECDH) which allows the parties to establish a shared secret over an insecure channel. However, as shown in FIG. 1 quantum resistance using an EXT key, which could be a QKD-generated key is added to this functionality.

One of the biggest threats facing companies today is from hack now, decrypt later. This is the practice of cybercriminals stealing encrypted information with the intention of cracking it once quantum computers are powerful enough to break the encryption. Thanks to a better understanding of error mitigation and improved algorithms it is expected this point could be reached within a decade.

Quantum security via QKD is in the initial phases of deployment. There is a need to support this security today to protect today's data from decryption at a later date when quantum computing will readily support such techniques to overcome conventional public key cryptography.

QKD Approaches

QKD generally is a cryptographic process based on the principles of quantum mechanics for two endpoints to provide a shared, random secret key known only to them, i.e., a quantum key. The endpoints can use this quantum key to encrypt and decrypt messages, securely and without concern that an eavesdropper could break the encryption even with quantum computers. A first aspect of quantum keys is QKD, namely how do the two endpoints initially establish the quantum key.

Sneakernet—a simple way to protect the shared key is to have a person physically carry the key between the endpoints and apply it locally such that the key itself is not transmitted on the wire where interception is possible. This assumes that the endpoints, where the un-encrypted data and the keys are present is physically secured. This solution requires human effort and is inherently slow to update keys. It also relies on the human with the secret keys not being compromised. There is simply no way to scale this approach.

QKD—Single Span Solution—QKD provides a means to generate symmetric keys on both communicating sides without actually transmitting the keys. The quantum state of the signal is perturbed by any potential intrusion which is detected by the endpoints which then do not allow the keys to be used, i.e., the endpoints known in advance the quantum key has not been intercepted. The issue with this technology is that it is incompatible with optical amplification which renders it to be a single span technology, between 80-120 km. Of course, the vast majority of optical networks are more than a single span, i.e., this approach does not scale to regional and long-haul networks.

Figure 2:
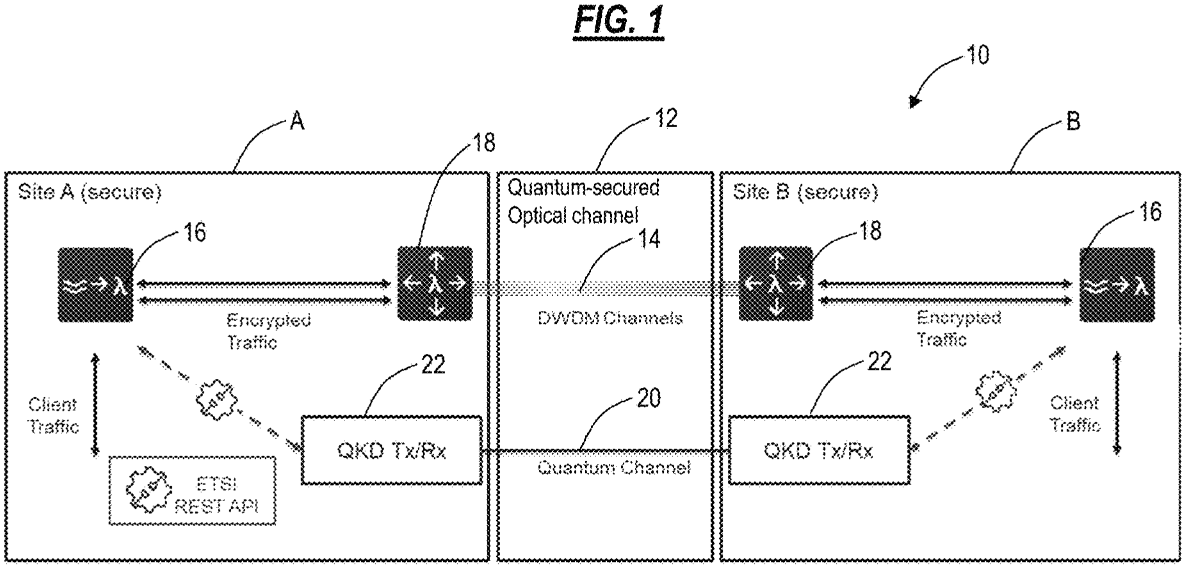
FIG. 2 depicts a Quantum-Secured optical channel established between two sites A, B utilizing QKD over a single fiber span.

FIG. 2 is a network diagram of a single optical span 10 between two sites A, B for providing QKD over an insecure fiber span 12. The sites A, B can be nodes where there is a set of Dense Wavelength Division Multiplexed (DWDM) channels 14 ("traffic channels"), such as ROADMs, OADMs, DWDM terminals, etc. The channels 14 formed by corresponding modems 16 at each of the sites A, B along with degree equipment 18, such as a Wavelength Selective Switch (WSS), amplifiers, etc. Those skilled in the art will appreciate this is a simplified view of an optical network, as the single span 10. A quantum channel 20 can either be established in the same fiber pair as the traffic channels or in its own fiber, via a pair of QKD transceiver (Tx/Rx) 22. The choice here depends on the details of the technology and the loss and interference encountered in the fiber.

Figure 3:
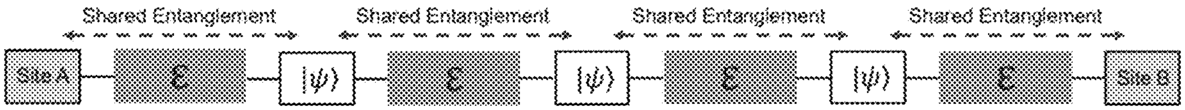
FIG. 3 depicts a multi-span quantum channel established with quantum repeaters.

Quantum Repeater—Multi-span Solution—Another promised technology is the so-called quantum repeater which uses an entangled state in order to establish long-distance quantum channel. FIG. 3 is a network diagram of a multi-span quantum network comprising quantum repeaters. This solution has not yet been demonstrated. Given its inherent complexity, the transmitters and receivers are likely to be more expensive than the single-span QKD solution and requires complex repeaters at each site. This technology has not yet been demonstrated in product.

Figure 4:
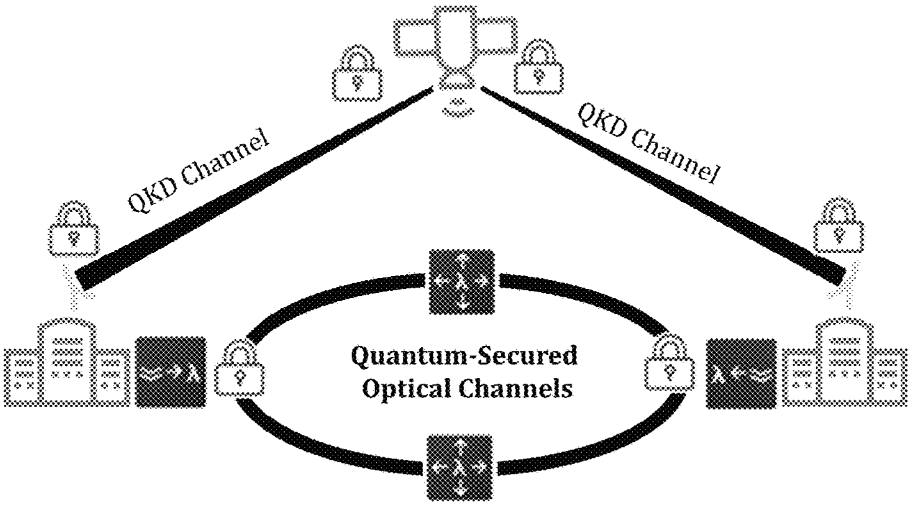
FIG. 4 is a network diagram of Quantum-Secured Optical Channels established via a satellite for a QKD channel.

Satellite QKD—Long Distance Solution—Yet another technology uses satellite communications for the QKD signal. FIG. 4 is a network diagram of two endpoints connected via a satellite for a QKD channel. This technology requires deployment of satellites with QKD capability which is expensive. It also requires the endpoints to have line-of-sight to the satellite. Also, this approach will face scalability issues as well.

Optical Networks

Of note, there are various approaches today for encrypting networks, using conventional PKI techniques. PKI poses a security problem in that the keys are generated based on some mathematical algorithms and the fact that there is sharing of a portion of the keys (public keys) in the open. The present disclosure addresses how optical networks can generate and distribute quantum keys as well as providing a quantum-secured channel where other keys can be distributed securely. That is, in some embodiments, in addition to QKD via the optical network, the present disclosure utilizes QC to encrypt the optical network as well. This can be required for providing the secure hardware infrastructure for QKD.

Optical networks can include various topologies with FIGS. 5-8 illustrating some example topologies for illustrating encryption on the optical channels. Those skilled in the art will appreciate these are some example network topologies; other topologies are also contemplated. FIGS. 5-8 illustrate physical locations interconnected by links and those skilled in the are will understand there is corresponding network equipment, e.g., network elements, at each of the physical locations for implementing the optical network.

Figure 5:
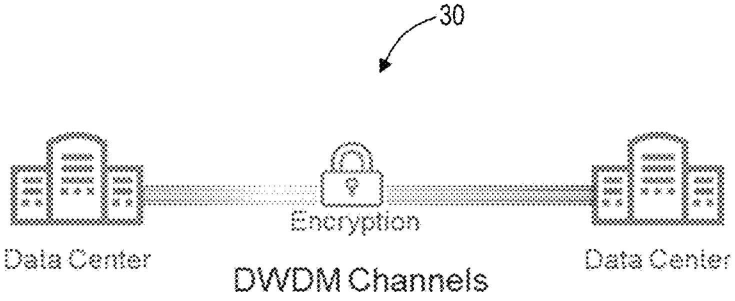
FIG. 5 is a network diagram of a point-to-point link such as, for example, Data Center Interconnection (DCI).

FIG. 5 is a network diagram of a point-to-point link 30 such as, for example, Data Center Interconnection (DCI). Here, there are two nodes (e.g., data centers) interconnected by a single span with one or more DWDM channels. The single span means there are no intermediate sites for optical line amplifiers. The DWDM channels between the two data centers can utilize encryption thereon.

Figure 6:
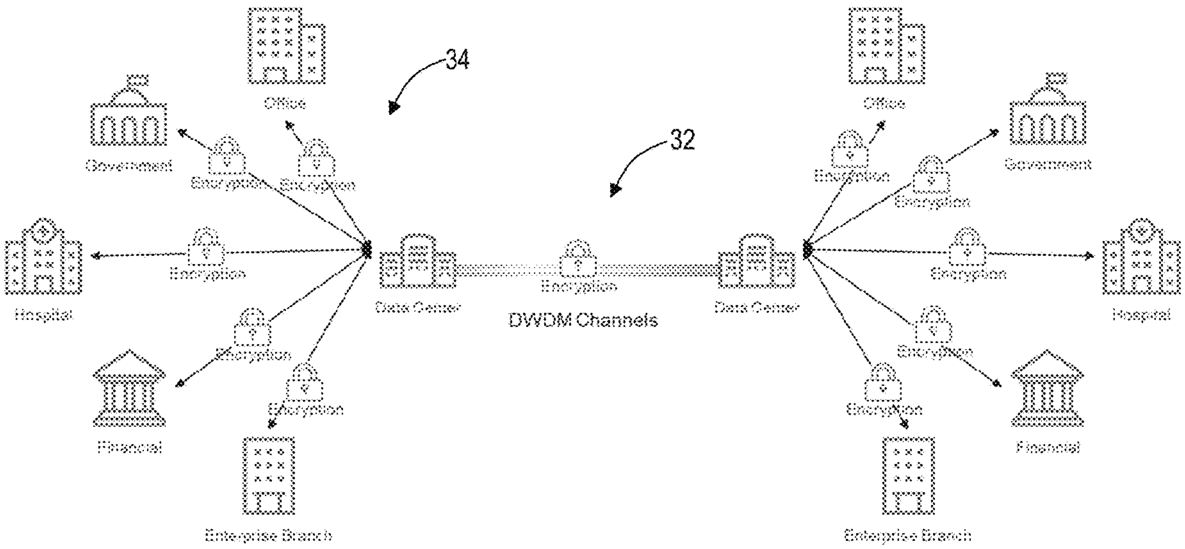

FIG. 6 is a network diagram of a point-to-point link 32 with DWDM channels with one or more additional spans 34 interconnecting enterprises or the like. This includes the DCI, e.g., along with additional optical spans to connect external users, e.g., enterprises. In this manner, there can be encrypted channels between the data centers as well as encryption between the data center and the external users, i.e., two to three spans or more, each encrypted.

Figure 7:
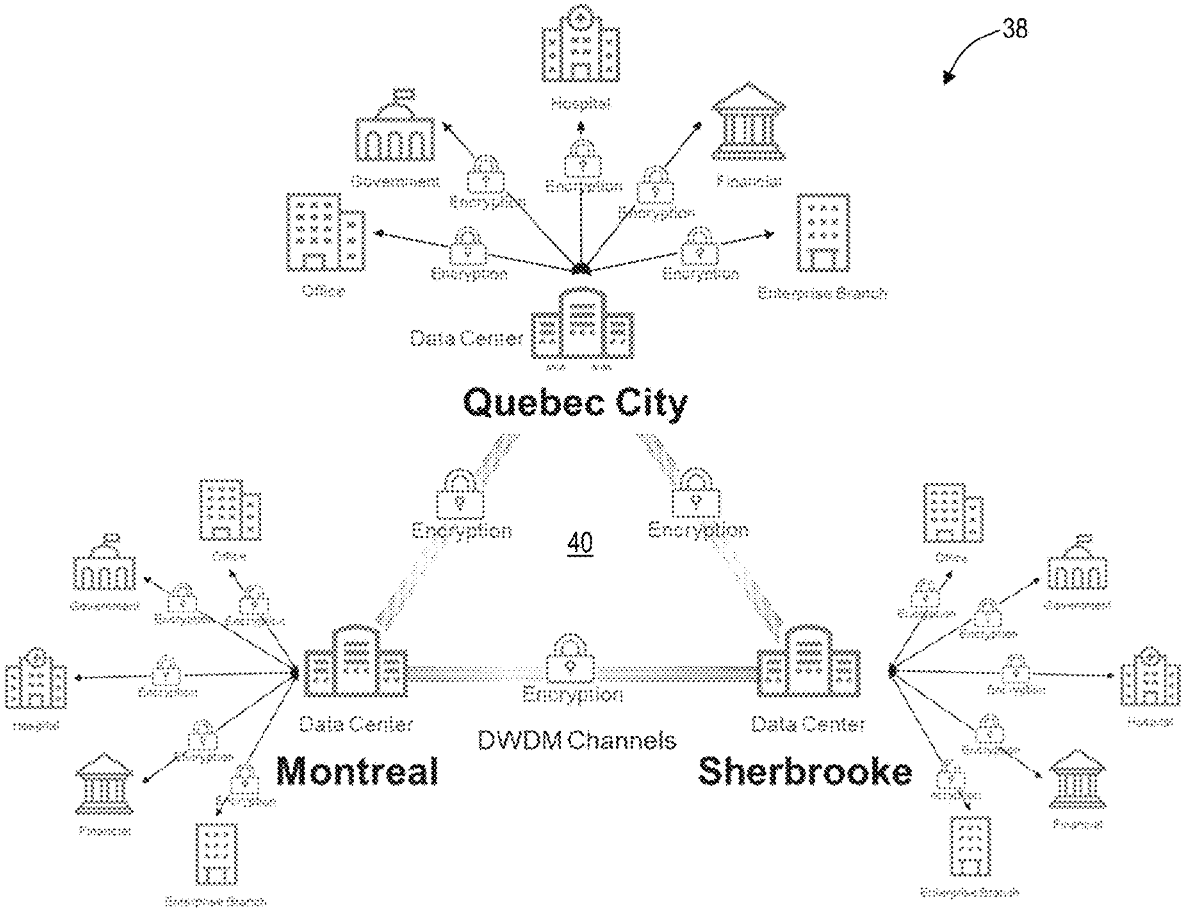
Figure 8:
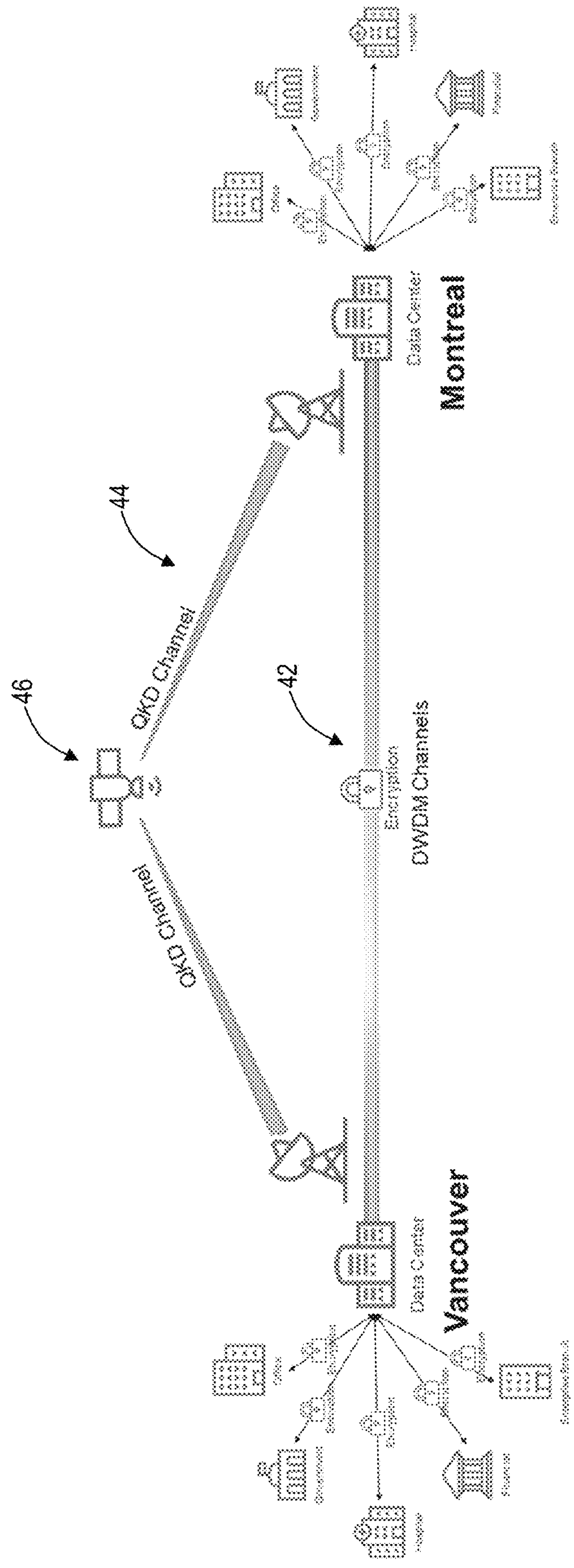

FIG. 7 is a network diagram of a mesh 38 or ring 40 interconnect with DWDM channels along with one or more additional spans interconnecting enterprises or the like. This includes more than one span in the core DWDM network, i.e., a mesh, ring, or combinations. There can be multiple spans, each encrypted. FIG. 8 is a network diagram of a long-haul link 42 between two sites (data centers) along with one or more additional spans interconnecting enterprises or the like. Note, the long-haul link can include multiple other nodes including express through nodes and line amplifiers (intermediate nodes). There can be a QKD channel 44 via a satellite 46.

Again, those skilled in the art will recognize there can be various other topologies. The key here is a practical optical network is not a single span in practice. Also, again, quantum key distribution requires a single span. The present disclosure addresses how to incorporate QKD in multiple span optical networks as well as how to support QC encryption on the optical channels. As described herein and as is known in the art, a span refers to a link in an optical network between two sites, and, more specifically, between two amplifiers. The point-to-point links 30, 32 are each a single span whereas FIGS. 6-8 illustrates multiple spans. In optical networking terminology, an optical multiplex section (OMS) includes one or more spans between nodes. A multi-span OMS or link is one that includes one more line amplifiers (intermediate nodes).

QKD Box

Figure 9:
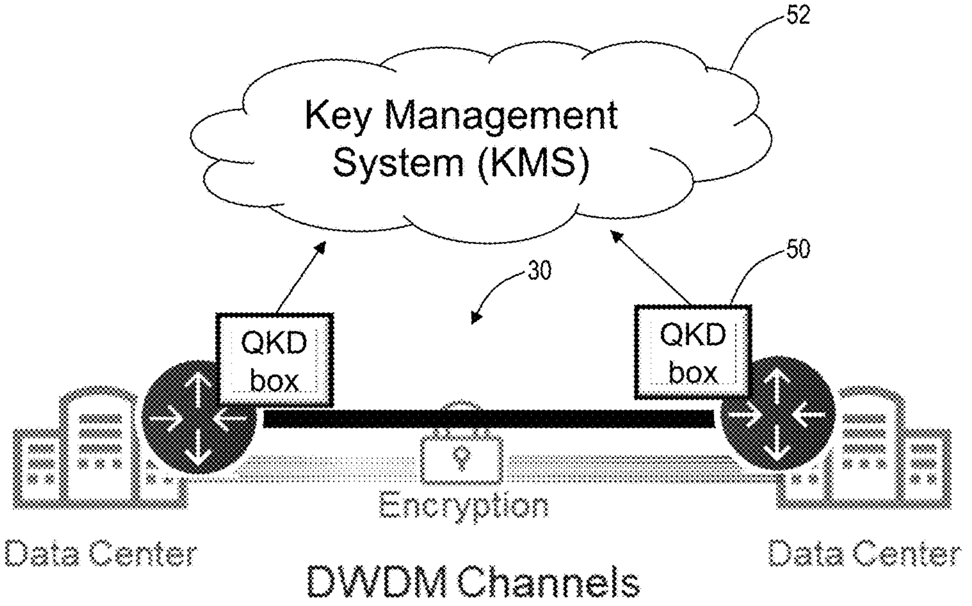
FIG. 9 is a network diagram of the point-to-point link from FIG. 5 illustrating the inclusion of QKD therein.
Figure 10:
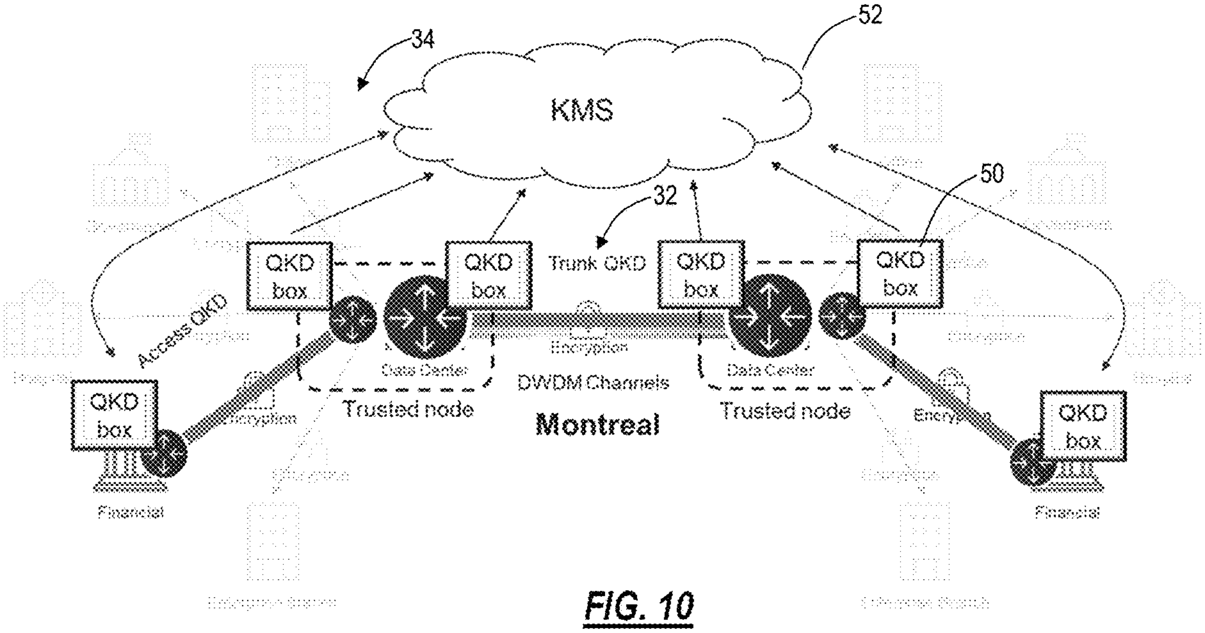
FIG. 10 is a network diagram of the point-to-point link with DWDM channels with one or more additional spans interconnecting enterprises from FIG. 6 illustrating the inclusion of QKD therein.
Figure 11:
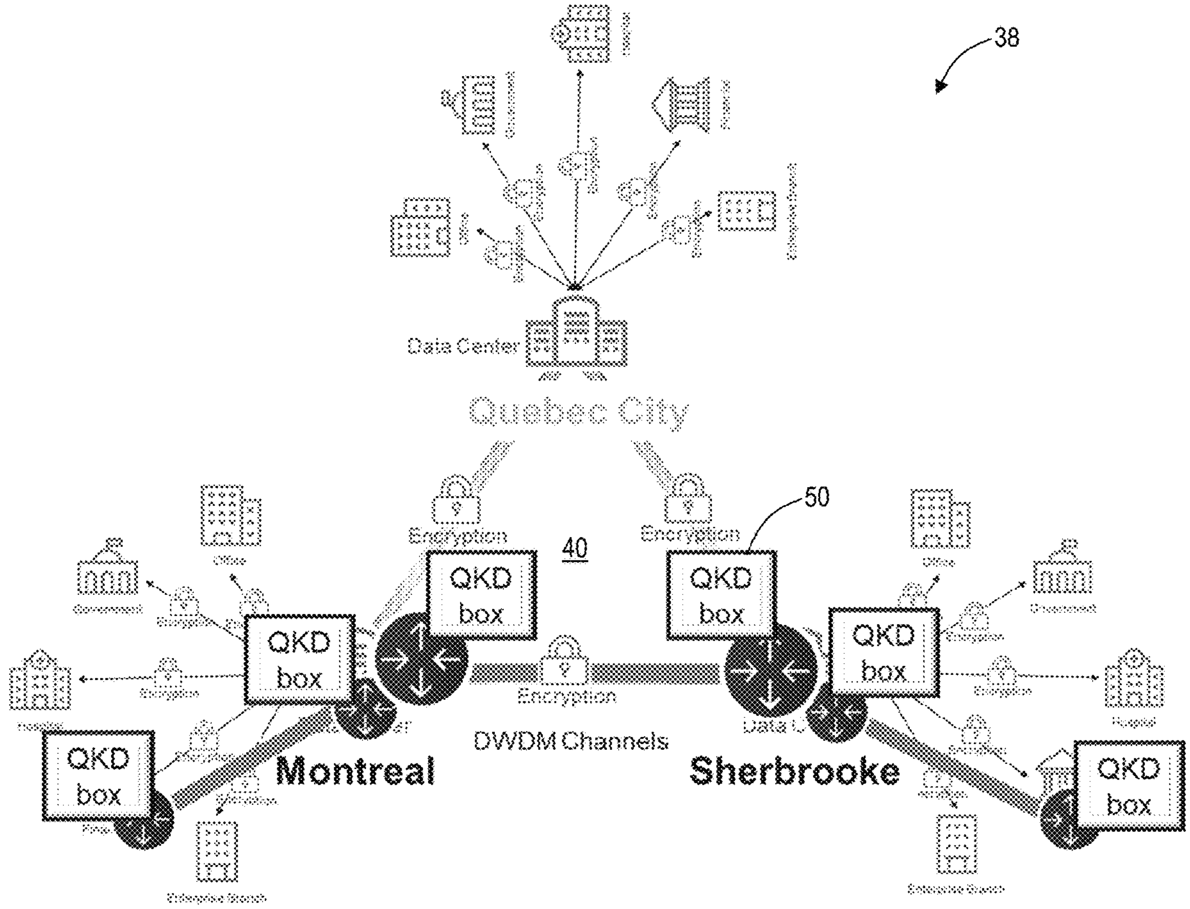
FIG. 11 is a network diagram of a regional network illustrating the inclusion of QKD therein with multiple spans.

FIGS. 9-11 illustrate the use of a QKD box 50 and key management system (KMS) 52 with an optical network. Specifically, the QKD box 50 includes various equipment integrated with optical networking equipment for enabling QKD, across multiple spans within an existing optical network. In some embodiments, the QKD box 50 is referred to herein as a Quantum-Optical Service Module (QOSM), and the KMS 52 is implemented via Key Management Modules (KMM).

FIG. 9 is a network diagram of the point-to-point link 30 from FIG. 5 illustrating the inclusion of QKD therein. In addition to the optical networking equipment used to support the point-to-point link, there can be a QKD box 50 at each site that communicate to one another via the fiber span and to the KMS 52. The QKD boxes 50 can support a high throughput, high baud modem, to provide "many" QKD sessions on one channel. As this is a single span, the reach can be about 24 dB.

FIG. 10 is a network diagram of the point-to-point link 32 with DWDM channels with one or more additional spans 34 interconnecting enterprises from FIG. 6 illustrating the inclusion of QKD therein. Here, there needs to be multiple QKD boxes 50 at the data centers, supporting the DWDM fiber link, and one for each site on the additional spans 34. Now, there is a need for end-to-end key management to extend multiple spans, paths, vendors, etc., which is implemented via the KMS 52. The KMS 52 includes an approach to securely switch keys between the QKD boxes 50. Each point-to-point link between QKD boxes 50 is a quantum-secured channel, with a quantum key between each QKD box 50 pair. The KMS 52 provides an ability to switch other keys securely between QKD boxes 50, so that the keys are never transmitted in the open, on an insecure fiber link, but rather over quantum-secured channels. Also, there can be multiple QKD boxes 50 per site, e.g., the data centers can have QKD boxes 50 for the point-to-point link 32, which is called a trunk QKD link, and then additional QKD boxes 50 facing sites on the additional spans 34. That is, each QKD link is a point-to-point connection in the optical network, similar to an optical service channel (OSCs). Also, there can be different variants of QKD modems in the QKD boxes 50, for different performance, reach, etc. This approach requires trusted nodes in the network.

FIG. 11 is a network diagram of a regional network illustrating the inclusion of QKD therein with multiple spans. This allows connecting end users via data centers between cities. The KMS 52 becomes more critical. Reach is now beyond commercial technology solutions available today. There is a requirement for a trusted node in the data center, as well as inside the optical network (e.g., at optical line amplifiers). The present disclosure includes approaches for integrated trusted nodes in the optical network. The trusted nodes can include the QKD boxes 50 and the like.

Secure Regen-Based QKD Transmission in an Optical Line System

Figure 12:
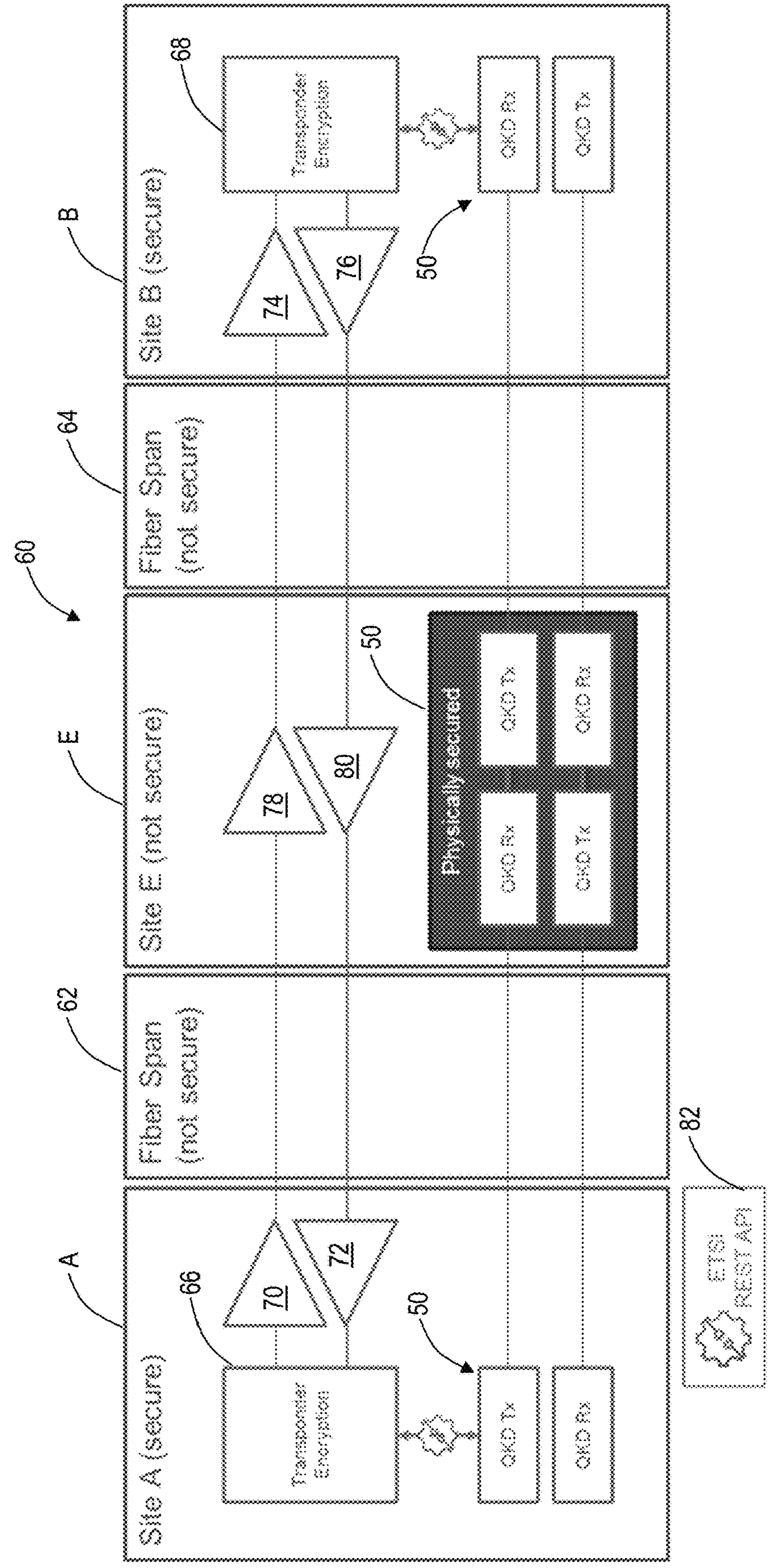
FIG. 12 is a network diagram of an optical line span between two sites A, B with an intermediate trusted node at a site E.

FIG. 12 is a network diagram of an optical line span 60 between two sites A, B with an intermediate trusted node at a site E. The sites A, B are nodes and the site E is a line amplifier, with fiber spans 62, 64 between the sites A, E, B. The sites A, B can be viewed as secure, having physical security, e.g., data centers with physical access control and monitoring. However, the fiber spans 62, 64 and the site E are viewed as non-secure. Specifically, the fiber spans 62, 64 are distributed between the sites A, E, B, e.g., on the road, right-of-way, etc. The site E can be at a non-secure location, e.g., telecom hut along the road, etc.

The sites A, B include optical transponders 66, 68 and amplifiers 70, 72, 74, 76. The intermediate line amplifier site E includes amplifiers 78, 80. As is known in the art, a typical optical network includes bi-directional communication between the sites A, B typically with two fibers, namely one for transmit from the site A to the site B and one for transmit from the site B to the site A. Of course, those skilled in the art will appreciate other approaches are possible, e.g., single fiber with bi-directional WDM therein, more than two fibers, etc.

The present disclosure includes QKD devices 50 at each of the sites A, E, B. The QKD devices 50 include QKD transmitters (Tx) and receivers (Rx). At the sites A, B, the QKD devices 50 include a single QKD Tx/Rx whereas at the site E, the QKD device 50 includes back-to-back QKD Tx/Rx in physically secure hardware, i.e., the QKD device 50 at the site E can be a physically secure trusted node at the site E. The physically secure trusted node can be a secure QKD regenerator, i.e., back-to-back QKD Tx/Rx. As is described herein, this can replace the existing OSC. Note, the QKD device 50 at the sites A, B can also be in a secure enclosure. One aspect of the physically secure hardware can include detection of any access attempt, e.g., alarm, so that any keys can be revoked, reissued, etc.

The operating principle is to use standard QKD technology plus additional session key transfer features at the end points, but in the insecure amplifier locations, to provide a secure deployment of the same QKD technology. The product provides a physically secured tamper proof environment for the QKD such that the unprotected key data is never exposed. Tampering with the QKD equipment results in destruction of the transponder and the key material itself. Similar tamper-proof designs are used in Federal Information Processing Standard (FIPS) compliant equipment today for any location where key material can be found.

In this way, one can provide an arbitrary number of fiber spans between the endpoints and create a secure network which can span the usual distances required by fiber optic transmission equipment today. There can be a REST API 82 between the QKD Tx/Rx at the sites A, B, and the optical transponders for also enabling QC encryption on the fiber span.

Hyper Service Channel (HSC)

Conventional optical networks utilize a so-called OSC (optical service channel or optical supervisory channel). This is a point-to-point channel, optically terminated at every node, including ROADMs, terminals, OADMs, line amplifiers, etc., with a wavelength that is typically out-of-band relative to traffic channels (i.e., outside of the amplification band). The OSC channel is used to provide Operations, Administration, Maintenance, and Provisioning (OAM&P) communications between every node. Specifically, intermediate optical amplifiers have no access to digital communications as the inputs and outputs are all optical through the amplifiers included therein. That is, conventional optical networks with amplifiers include OSCs throughout, providing a point-to-point network for telemetry, OAM&P, and the like, such as at the site E.

In various embodiments, the present disclosure contemplates a new channel that can take the place of the OSC. We call this channel a Hyper Service Channel (HSC), but those skilled in the art will recognize other names can be used. This channel can support:

1) QKD service channels, including clocking, two-way communications for postprocessing operations, etc.,
2) Session Key Transfer service channel,
3) Conventional OSC communication carrying inter-node communications, clocking, remote updates, etc., and/or
4) Key Management Service channel.

This can be referred to as a multi-degree quantum-optical trusted repeater system for quantum-secured optical channels. By utilizing an end-to-end multi-degree integrated quantum-optical architecture based on a quantum-secured coherent hyper service channel described herein, the present disclosure provides a higher level of security comparing to the current trusted node solutions and can be scaled for the deployment of quantum-secured channels in a large-scale network environment. Advantageously, this architecture can be integrated into existing optical line systems, allowing QKD, key management, and the like in addition to traditional OSC communications.

Multi-Degree Quantum-Optical Trusted Repeater System

The purpose of the present disclosure, i.e., the multi-degree quantum-optical trusted repeater system for quantum-secured optical channels, is to extend the reach of the QKD-based quantum-secured optical channels to long distances beyond the limit of the non-repeater-based systems (a single span). The present disclosure reuses the concepts of trusted nodes and QKD, and incorporates them into an optical line system. This end-to-end concept provides a versatile and highly secure trusted system for transporting long-distance quantum-secured optical channels in a network environment.

Figure 13:
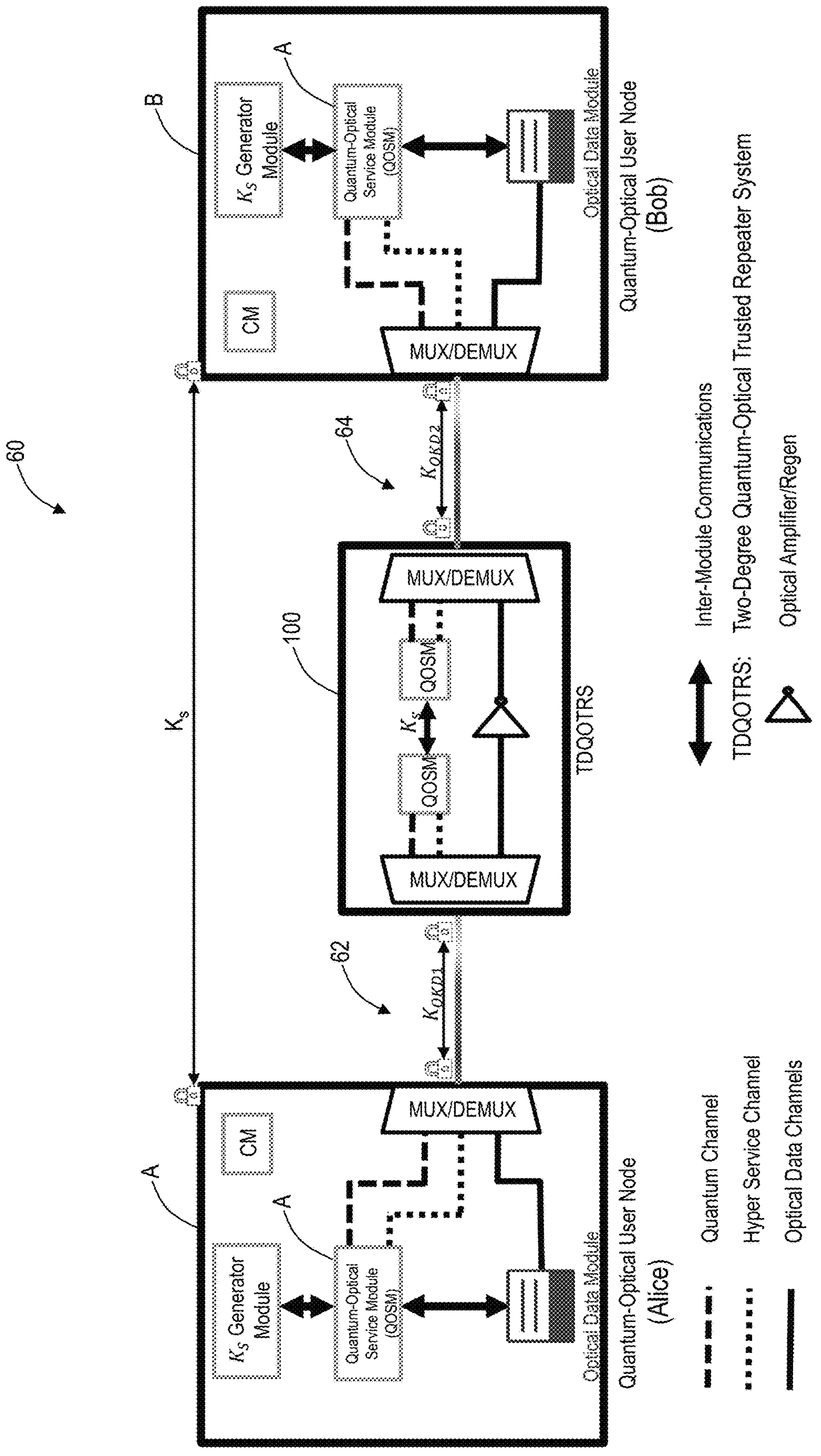
FIG. 13 is a network diagram of a two-degree Quantum-Optical Trusted Repeater System.

FIG. 13 is a network diagram of the optical line span 60 with a two-degree quantum-optical trusted repeater system 100 at the site E. Note, this is a subset of a typical deployment, i.e., two-degrees, and those skilled in the art will appreciate practical embodiments may include more than two-degrees.

This end-to-end architecture of the optical line span includes two types of nodes: a Quantum-Optical User Node, such as at the sites A (Alice), B (Bob), and the Quantum-Optical Trusted Repeater System 100 at the site E. Basically, terminal sites include the Quantum-Optical User Node and intermediate line amplifier sites include the Quantum-Optical Trusted Repeater System 100. As described herein, the functionality described herein can be modules, and a module can be realized with physical hardware including circuitry, optical interfaces, firmware, software, and the like, to perform the associated functionality described herein.

Each one of the Quantum-Optical User Nodes (Alice and Bob) includes four main modules.

1) $K_s$ Generator Module: The Session Key ($K_s$) Generator module generates the session keys that will be used to secure an end-to-end long-distance communication between the sites A, B.

2) Quantum-Optical Service Module (QOSM): In tandem with its corresponding QKD QOSM inside the Two-Degree Quantum-Optical Trusted Repeater System (TDQOTRS), this module conducts the following operations:

- 2.1) Generating QKD keys ($K_{QKD}$) via the Quantum and QKD service channels.
- 2.2) Receiving the Session Keys ($K_s$) from the $K_s$ Generator module and passing them to the TDQOTRS (if there is an intermediate line amplifier).
- 2.3) Establishing the required service channels for the QKD key generation process to provide services such as clocking and two-way communications for postprocessing operations.
- 2.4) Establishing the Session Key Transfer channel to transfer/receive the Session Keys ($K_s$).
- 2.5) Establishing an OSC to provide services such as inter-node communications, clocking and remote updates/diagnosis.
- 2.6) Establishing the Key Management Service channel (discussed later herein).
- 2.7) Providing the established Session Keys ($K_s$) to the Optical Data Module
- 2.8) Multiplexing/demultiplexing all the QKD service channels, the Session Key Transfer channel, the OSC channel and the Key Management Service channel into a Hyper Service Channel (HSC). The HSC channel can be a coherently-modulated channel.
- 2.9) Using the QKD-generated keys to quantum-secure the coherent Hyper Service Channel (HSC).

3) Optical Data Module: This module uses the Session Keys ($K_s$) to encrypt the optical data channels using an optical-layer encryption method (such as AES-256).

4) Mux/Demux Module: This module multiplex/demultiplex the Quantum Channel, the HSC and the optical data channels into/out of the transport fiber. This is used when the HSC is on the same fiber as the traffic-carrying channels.

5) Control Module: This module conducts the key management operation at the Quantum-Optical User Nodes via communications with the Key Management Module (discussed later) over the HSC.

These Quantum-Optical User Nodes are served as the end nodes and might be located at the terminal nodes in the optical network. Conversely, the Two-Degree Quantum-Optical Trusted Repeater System (TDQOTRS) are located at intermediate line amplifier sites.

The TDQOTRS includes three main modules:

1) Quantum-Optical Service Module (QOSM): This module mirrors the QOSM on the Quantum-Optical User Nodes (Alice or Bob), providing all the required services described before and also exchanging the Session Keys ($K_s$) from one Quantum-Optical User Node to the other via passing it to the other QOSM.

2) Mux/Demux: This module mirrors the Mux/Demux module on the Quantum-Optical User Nodes, as discussed before.

3) Optical Amplifier/Regen: This module amplifies/regenerates the optical data channels, as required.

The Quantum-Optical User Node that initiates the session generates the Session Keys ($K_s$) using the Session Key ($K_s$) Generator module, as frequently as required, during the communication period. The Session Keys ($K_s$) are transferred quantum-securely between each Quantum-Optical User Node and the TDQOTRS. Inside the TDQOTRS, the Session Keys ($K_s$) are transferred from one QOSM to the next and eventually to the other Quantum-Optical User Node. Therefore, the present disclosure requires a trusted system for the Session Key ($K_s$) transfer between the spans, hence the word "Trusted" in the Quantum-Optical Trusted Repeater System. Depending on the distance between the two communication parties, as many TDQOTRS as required could be utilized to connect the short-distance spans (over which QKD can be established). Obviously, one might consider a simpler version of this by only quantum-securing the Session Key Transfer channel using a QKD-generated key for each span instead of the entire HSC. However, that implementation would lower/nullify the high level of security provided by the quantum-secured coherent HSC methodology proposed in this invention.

Figure 14:
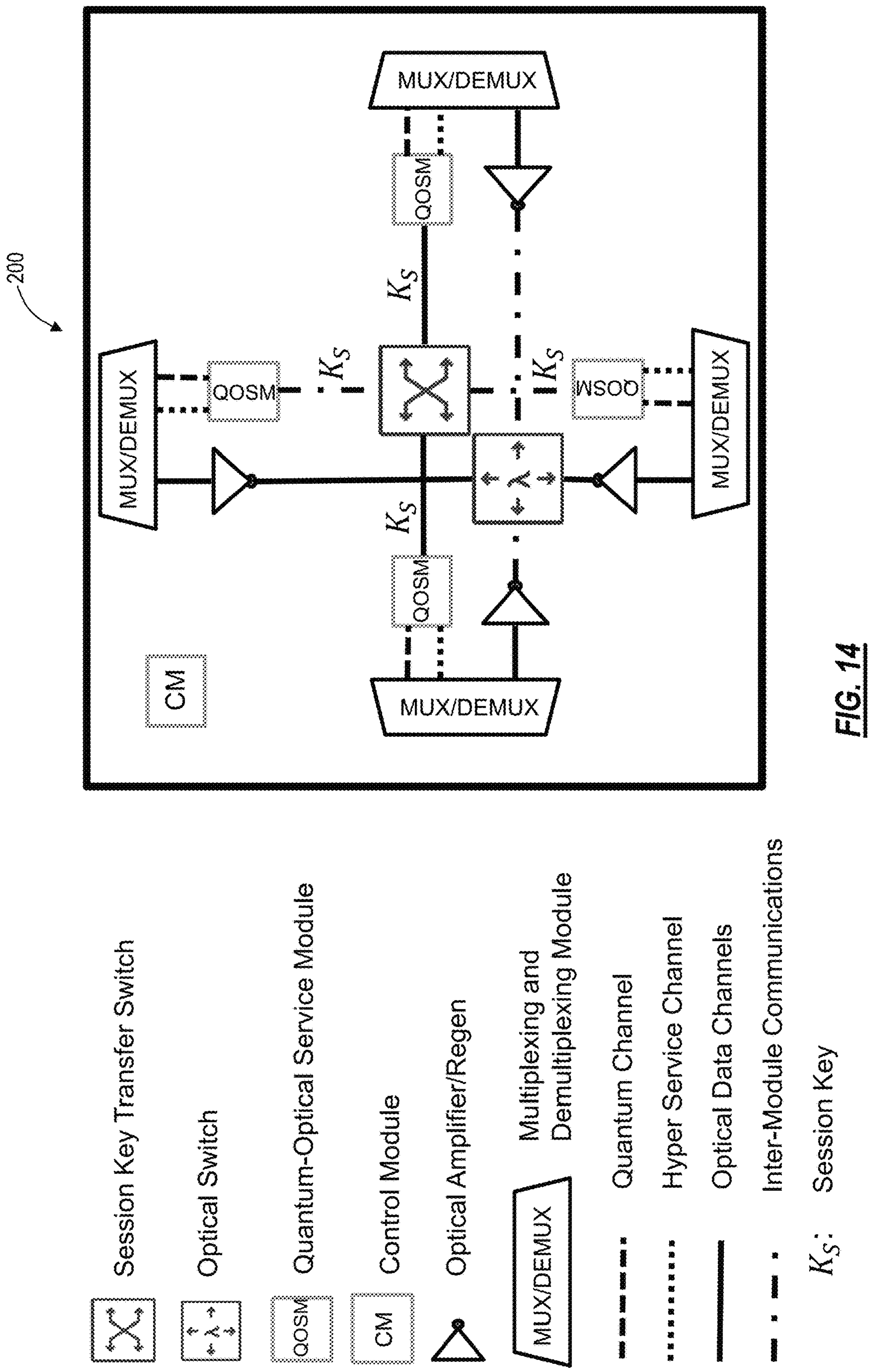
FIG. 14 is a diagram of a Multi-Degree Quantum-Optical Trusted Repeater System.

FIG. 14 is a diagram of a Multi-Degree Quantum-Optical Trusted Repeater System (MDQOTRS) 200. The Multi-Degree Quantum-Optical Trusted Repeater System (MDQOTRS) utilizes the same idea discussed for the Two-Degree Quantum-Optical Trusted Repeater System, expanded into multi-degrees to support multi users. The MDQOTRS 200 can be deployed at a terminal node that supports more than one degree, to enable secure key transport between degrees.

In addition to the QOSM, Mux/Demux and the Optical Amplifier/Regen modules discussed in the Two-Degree case, the Multi-Degree Quantum-Optical Trusted Repeater System (MDQOTRS) also contains the following modules:

1) Session Key Transfer Switch: This module transfers the Session Keys ($K_s$) between different Quantum-Optical User Nodes depending on the session request submitted by each one of those nodes to the Key Management Module.

2) Optical Switch: This module connects the optical data channels between different users depending on the session request submitted by the users to the Key Management Module.

3) Control Module: This module controls the Session Key Transfer Switch and the Optical Switch based on the communications with the Key Management Module (discussed later).

Figure 15:
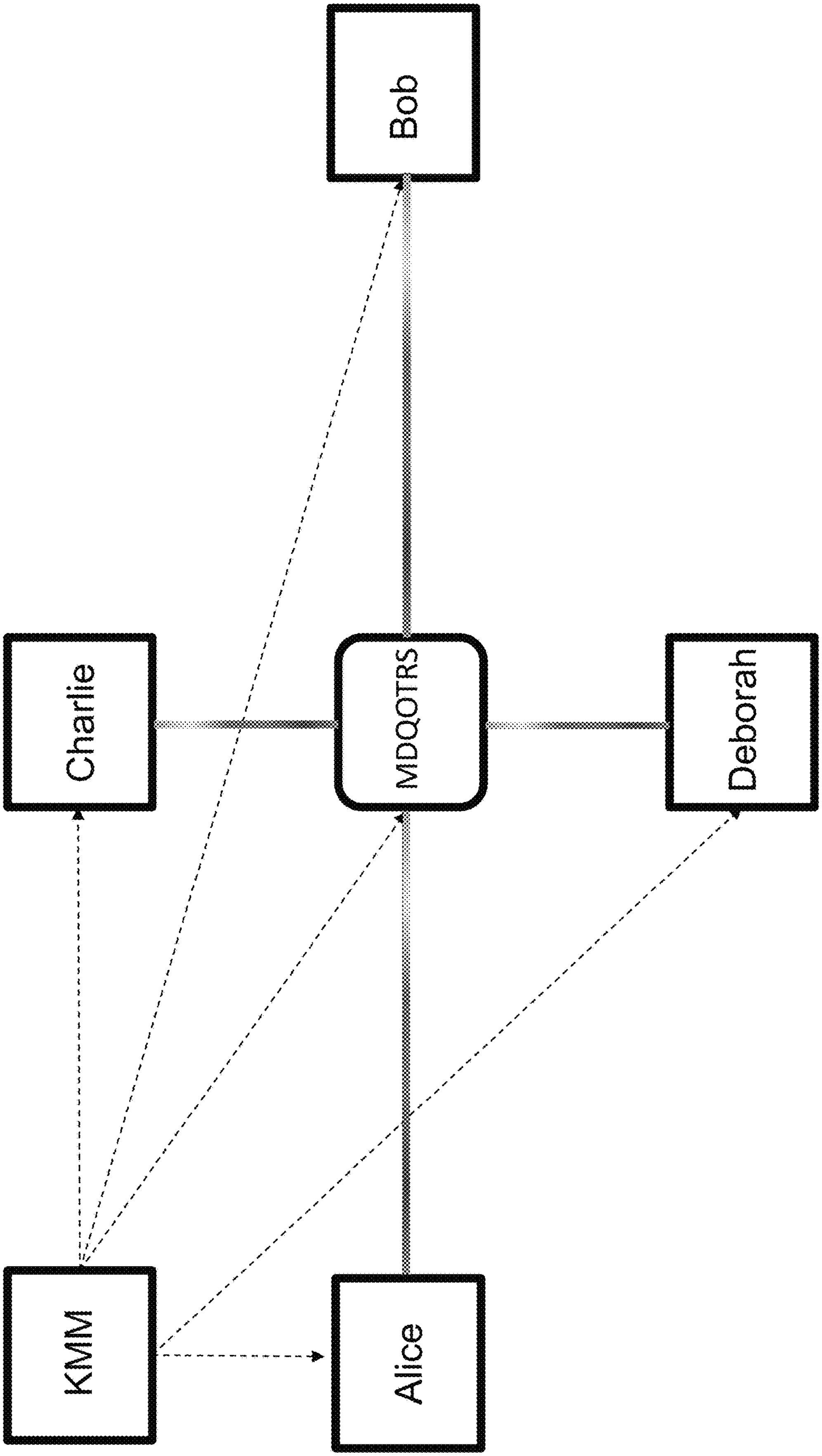
FIG. 15 illustrates a diagram of a Multi-Degree Quantum-Optical Trusted Repeater System in a Network Environment.

FIG. 15 illustrates a diagram of a Multi-Degree Quantum-Optical Trusted Repeater System in a Network Environment. The Multi-Degree Quantum-Optical Trusted Repeater System (MDQOTRS) operates in a network environment with multiple Quantum-Optical User Nodes in coordination with the Key Management Module (KMM). Once a Quantum-Optical User Node submits a request to the KMM to establish an end-to-end quantum-secured communication channel with another user, the KMM communicates that request to the Control Module inside each MDQOTRS to establish the end-to-end quantum-secured channel.

FIGS. 14 and 15 depict the present disclosure for four users (sites Alice, Bob, Charlie, and Deborah) to convey the idea. However, those skilled in the art will appreciate there is no limit on the number of users that the MDQOTRS can support. Even multiple ports in a MDQOTRS can be assigned as backup routes for a single Quantum-Optical User Node to provide rerouting in case of a route failure, thereby increasing the network reliability.

Several MDQOTRS systems can be connected to support a large network topology in any shape and form.

Multiple Key Management Modules (KMM) could be deployed as a part of an overall key management system for a network in order to eliminate a single point of failure for the key management process.

HSC/OSC Encryption

The OSC is also a vulnerability to attack both the classical channel and the communication. One element of the novelty here is the use of a quantum encrypted (self generated at the repeater) and the use of a coherent channel for the OSC (to reduce cross talk as an attack vector).

Technology and Standardization

It is noted there will need to be QKD interoperability standards for multi-vendor support, and the present disclosure contemplates various approaches including, e.g.,

- Continuous-variable quantum key distribution (CV-QKD)
- Discrete-variable quantum key distribution (DV-QKD)
- Entanglement-based QKD
- Measurement-device-independent quantum key distribution (MDI-QKD)
- Coherent one-way (COW) QKD
- Bennett-Brassard 1984 (BB84) protocol
- Twin-field (TF) QKD
- Bennett, Brassard and Mermin in 1992 (BBM92) protocol Physical Security Various physical devices described herein, such as the QKD device 50, the Quantum-Optical Service Modules (QOSM), the session key transfer switch, and the like, can be secured in that any attempt to access these physical devices can raise an alarm, notification, etc. Further, any attempt can cause nullification of keys. This ensures the quantum-secured channel maintains its security. In this manner, the system is protected from intrusions, from rogue repeaters, etc. For example, a rogue repeater can be a device that is added to the system or where an existing device is taken over by a third party.

Authentication for Startup

Prior to startup of the quantum-secured channel, there is a requirement to authenticate the associated modules in the quantum-secured channel, i.e., to ensure they are trusted, not compromised, not rogue, etc. In a point-to-point system the endpoints are assumed to be secured locations and the quantum-secured channel protects the transmission between the end points. The user does the authentication, i.e., provides key material, at the protected endpoints. In an optical network, every ROADM or terminal node can be an endpoint. The problem of quantum repeaters in the middle is that they are not protected, but rather trusted nodes.

The present disclosure contemplates an authentication process where each component, e.g., the QKD device 50, the Quantum-Optical Service Modules (QOSM), the session key transfer switch, and the like, are authenticated before they start the quantum-secured channel, for the purpose of ensuring the devices are trusted. The present disclosure contemplates various approaches including visual inspection, certificates installed on the physical devices, etc. For example, a user can validate that the equipment is as expected visually before applying the authentication for the current link (between the two ends of a quantum-secured channel). The issue is that if the authentication was more automatic, each node in the link would be remotely authenticated without verification that the equipment is not compromised. This compromise can be prevented by applying physical means like potting, fuses, tamperproof packaging, etc. such that compromised equipment becomes inoperable or obviously tampered with. Remote authentication without inspection may open the system up to rogue equipment, i.e., rogue repeater, which could be compromised. The authentication process should therefore be a one-time process which is locked out once key materials are validated at system turn up. To repair a compromised line (each node on the two ends of a quantum-secured channel) would require site visits to the trusted nodes to put them back into authentication mode and the link brought up link by link.

CONCLUSION

It will be appreciated that some embodiments described herein may include one or more generic or specialized processors ("one or more processors") such as microprocessors; central processing units (CPUs); digital signal processors (DSPs): optical and quantum-specific elements, customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, quantum memory and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A node for operation in an optical network, the node comprising:

one or more degrees each connected to a corresponding optical span including one or more fibers; and one or more Quantum-Optical Service Modules (QOSM) for each of the one or more degrees, each QOSM supporting Quantum Key Distribution (QKD) for establishing a quantum-secured channel and Optical Service Channel (OSC) functionality over the quantum-secured channel wherein each QOSM includes a QKD transmitter and receiver and circuitry configured to establish, with an adjacent node over the corresponding optical span, a quantum channel and an associated QKD service channel for QKD key generation, wherein the circuitry is configured to establish a Hyper Service Channel (HSC) that includes the OSC, wherein each QOSM is configured to multiplex/demultiplex the QKD service channel and the OSC into/from the HSC, and wherein the circuitry is configured to quantum-secure the OSC by applying QKD-generated keys such that OSC communications are carried over the quantum-secured channel.

2. The node of claim 1, wherein each quantum-secured channel is formed with an adjacent node which is one of another node or a line amplifier, and wherein the one or more QOSMs include circuitry configured to exchange keys over the quantum-secured channel.

3. The node of claim 2, further comprising one or more optical modems configured to support traffic channels over an optical span, wherein data transmitted via the one or more modems is encrypted based on one of the keys.

4. The node of claim 1, wherein a QOSM of the one or more QOSMs includes a transmitter and receiver, each supporting coherent modulation.

5. The node of claim 1, wherein the one or more QOSMs include a plurality of QOSMs, and further comprising a session key transfer switch configured to switch keys from a first QOSM to a second QOSM, of the plurality of QOSMs.

6. The node of claim 1, wherein a QOSM of the one or more QOSMs includes circuitry configured to implement a QKD service channel, a session key transfer service channel, the OSC functionality, and a key management service channel.

7. The node of claim 1, wherein a QOSM of the one or more QOSMs includes circuitry configured to implement a QKD service channel, wherein the circuitry is further configured to detect an intrusion on the QKD service channel and to one or more of provide an alarm and nullify any keys based thereon.

8. The node of claim 1, further comprising circuitry configured to implement an Application Programming Interface (API) between the one or more QOSMs and any data interfaces connected to associated degrees.

9. The node of claim 1, wherein a QOSM of the one or more QOSMs includes a hardened enclosure configured to detect physical intrusions and to adjust any keys based on detection of the physical intrusions.

10. The node of claim 1, further comprising a plurality optical modems configured to support traffic channels over the one or more degrees, wherein data transmitted via the plurality optical modems is encrypted based on a key from a corresponding QOSM, and at least two of the plurality optical modems utilize different keys.

11. The node of claim 1, wherein the HSC further comprises a session key transfer service channel and a key management service channel multiplexed with the OSC and the QKD service channel.

12. The node of claim 1, wherein the QOSM is configured to receive session keys from a session key generator module at the node and to transfer the session keys over the session key transfer service channel.

13. The node of claim 1, further comprising a mux/demux module configured to multiplex and demultiplex the quantum channel, the HSC, and one or more optical data channels into and out of the one or more fibers of the corresponding optical span.

14. The node of claim 1, wherein the HSC is a coherently-modulated optical channel.

15. The node of claim 1, wherein the quantum channel and the HSC are carried on a same fiber of the corresponding optical span.

16. The node of claim 1, wherein the quantum channel is carried on a dedicated fiber separate from a fiber carrying one or more traffic channels.

17. The node of claim 1, further comprising a control module configured to perform key management via communications with a key management module over the HSC.

18. The node of claim 1, wherein the QOSM is housed in a tamper-resistant enclosure including circuitry configured to detect an access attempt and, responsive to the detection, to invalidate or delete key material associated with the quantum-secured channel.

19. The node of claim 1, wherein the circuitry is configured to perform an authentication procedure, prior to enabling use of keys for the quantum-secured channel, to verify that at least the QOSM is trusted and not compromised.

20. A method for operating a node in an optical network, the method comprising:

providing one or more degrees each connected to a corresponding optical span including one or more fibers;

providing, for respective ones of the one or more degrees, one or more Quantum-Optical Service Modules (QOSMs) each including a QKD transceiver and circuitry;

for each QOSM, establishing with an adjacent node over the corresponding optical span a quantum channel and an associated QKD service channel to generate QKD keys;

establishing a hyper service channel (HSC) that comprises at least an optical service channel (OSC) for operations, administration, maintenance, and provisioning communications;

multiplexing the QKD service channel and the OSC into the HSC; and quantum-securing the OSC by applying the QKD keys such that the OSC functionality is provided over a quantum-secured channel.

* * * * *